United States Patent [19]
Iida et al.

[11] Patent Number: 5,020,424
[45] Date of Patent: Jun. 4, 1991

[54] APPARATUS FOR CONTROLLING AN AUTOMOTIVE AIR-CONDITIONER

[75] Inventors: Katsumi Iida; Yoshihiko Sakurai; Akihiko Takano, all of Konan; Hideo Yamaguchi; Teruaki Yano, both of Aki, all of Japan

[73] Assignees: Zexel Corporation, Tokyo; Mazda Motor Corporation, Hiroshima, both of Japan

[21] Appl. No.: 561,502

[22] Filed: Aug. 1, 1990

[30] Foreign Application Priority Data

Aug. 3, 1989 [JP] Japan .................................. 1-201967
Aug. 3, 1989 [JP] Japan .................................. 1-201968

[51] Int. Cl.[5] ............................................. B60H 1/00
[52] U.S. Cl. ...................................... 98/2.01; 165/42; 165/43
[58] Field of Search ................... 98/2.01, 2.11; 165/12, 165/28, 42, 43; 236/49.3

[56] References Cited

U.S. PATENT DOCUMENTS 4,434,932  3/1984  Hara et al. ..................... 98/2.01 X
4,760,772  8/1988  Horiguchi et al. ................ 98/2.01
4,961,462 10/1990  Iida et al. ...................... 98/2.01 X

FOREIGN PATENT DOCUMENTS 190520  7/1989  Japan ............................... 98/2.11

Primary Examiner—Harold Joyce
Attorney, Agent, or Firm—Wenderoth, Lind & Ponack

[57] ABSTRACT

An apparatus for controlling an automotive air-conditioner wherein an air distribution to left and right sides of a vehicle passenger compartment is achieved either in an automatic control mode or in a manual control mode which is selected by a judgement made based on the vehicle passenger compartment and the quantity of solar radiation. In case of the automatic control mode, the rate of change of the air distribution control is changed dependent upon the position set by an air-distribution setting unit relative to the direction of solar radiation so as to meet the occupant desire.

10 Claims, 10 Drawing Sheets

| | LEFT END | | | | | CENTER | | | | | RIGHT END |
|---|---|---|---|---|---|---|---|---|---|---|---|
| AIR-DISTRIBUTION LEVER POSITION | -5 | -4 | -3 | -2 | -1 | 0 | 1 | 2 | 3 | 4 | 5 |
| a % | 0 | 10 | 20 | 30 | 40 | 50 | 60 | 70 | 80 | 90 | 100 |
| b % | 0 | 10 | 20 | 20 | 20 | 20 | 20 | 20 | 13 | 7 | 0 |
| c % | 0 | 7 | 13 | 20 | 20 | 20 | 20 | 20 | 20 | 10 | 0 |

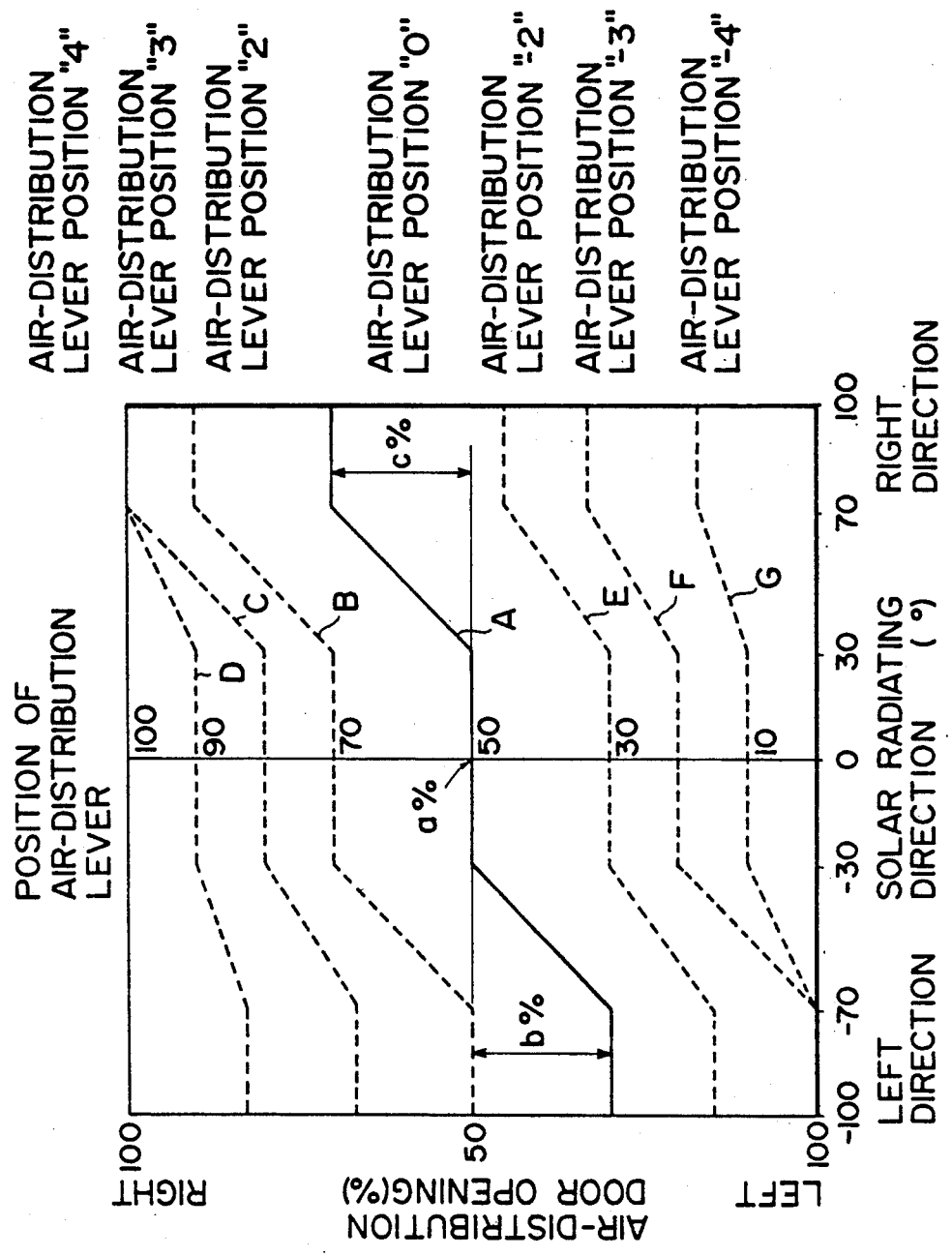

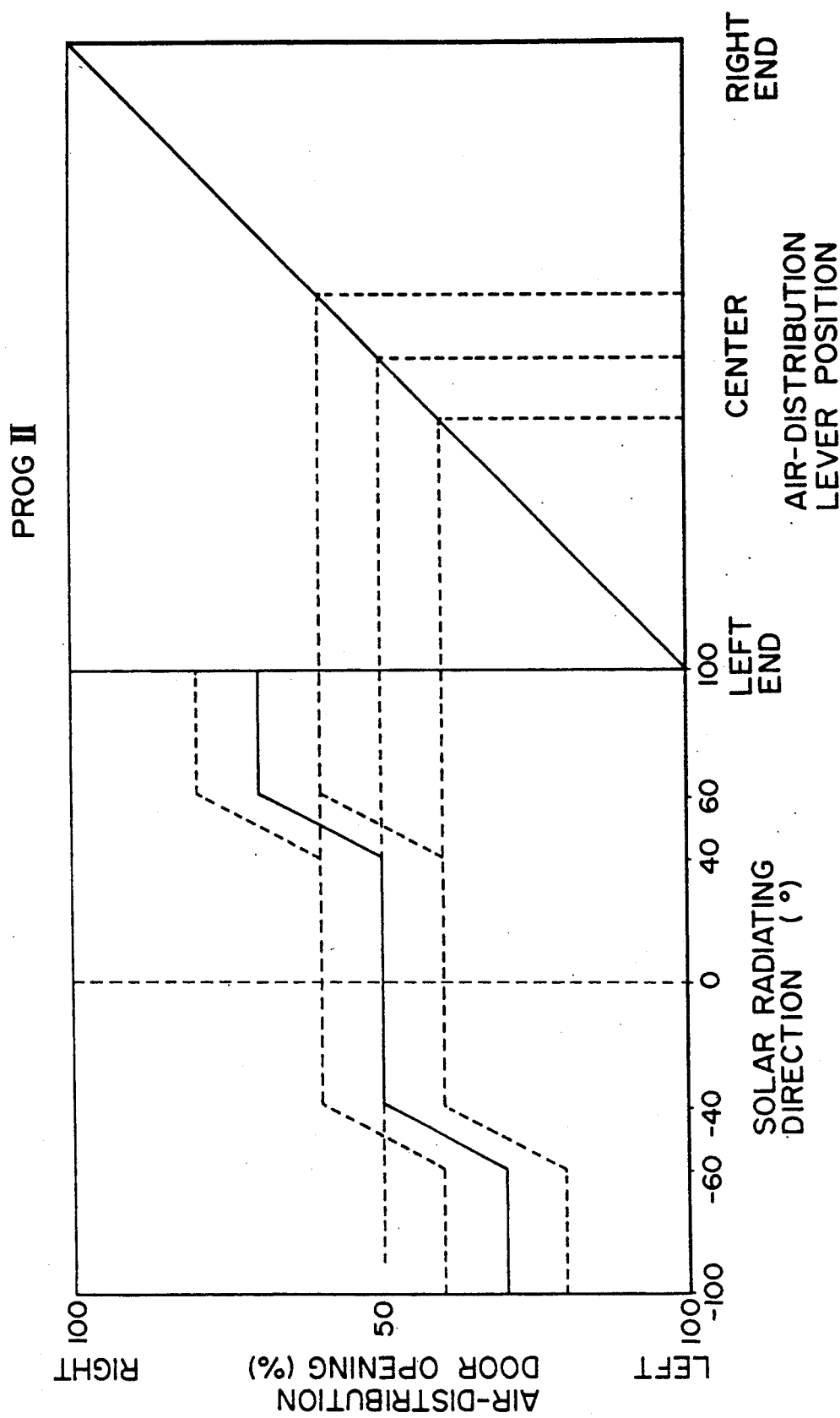
FIG. 11 PROG II

APPARATUS FOR CONTROLLING AN AUTOMOTIVE AIR-CONDITIONER

BACKGROUND OF THE INVENTION

1. Field of the Invention

The present invention relates to an apparatus for controlling an air-conditioner of a motor vehicle of the type wherein proportions of air to be distributed to left and right portions of a vehicle passenger compartment are controlled automatically or manually. More particularly, the invention is directed to such a control apparatus capable of using an automatic control mode and a manual control mode dependent upon the quantity of solar radiation. The invention further concerns an automotive air-conditioning controller having a function to compensate the imbalance in air distribution which could be caused dependent upon the direction of solar radiation.

2. Description of the Prior Art

There have been proposed various methods of automatically changing proportions of air discharged from left and right air outlets dependent upon quantities of solar radiation measures at left and right portions of a vehicle passenger compartment. According to one known such proposal disclosed in Japanese Utility Model Laid-open Publication No. 54-97947, the air-conditioning balance based on the control of the respective quantities of air discharged from the left and right air outlets is changed dependent upon the balance of the left and right solar radiation quantities for providing an improved air-conditioning feeling while a motor vehicle is cruising in the sunshine. Japanese Patent Publication No. 58-50884 discloses an automotive air-conditioner in which in addition to the foregoing automatic left and right air distribution control dependent upon the left and right solar radiation quantities, an air distribution setter is provided to manually distort the left and right air distribution control toward either side, thereby adjusting the automatic air-conditioning appropriately at the occupant's desire.

In the prior art arrangements, the automatic control of left and right air distribution is performed to vary the quantities of air at all times depending upon the quantity and direction of solar radiation irrespective of the occupant's feelings about the current air-conditioning state. For instance, it occurs likely that the quantity of air discharged toward the assistant driver's seat increases even in the absence of the assistant driver; the quantity of discharged air in a particular direction increases against the occupant's intent. The manual correction of the automatic air distribution control using the air distribution setter is not quite satisfactory in meeting the occupant desire.

Further more, when air distribution setter is set in a position to increase the air distribution quantity in one side, the automatic control of air distribution dependent upon the solar radiation quantities still has the same weight as such manual correction. Accordingly, if the opposite side is exposed to solar radiation due to the change of direction of the solar radiation, the discharged air quantity at the opposite side is increased under the force of the automatic control, while the quantity of air discharged toward the side selected by the air distribution setter decreases. A desired air distribution control is therefore difficult to obtain.

SUMMARY OF THE INVENTION

With the foregoing difficulties in view, it is an object of the present invention to provide an apparatus for controlling an automotive air-conditioner, which performs the properly use of an automatic control and a manual control to provide a left and right air-distribution control satisfactory to the occupant's desire, Another object of the present invention is to provide an automotive air-conditioner controlling apparatus in which when an air distribution setter is manually set in a distorted position to increase the discharged air quantity in one side during an automatic air distribution control mode, such manual setting at the occupant desire is performed adequately without causing an undue drop of the discharged air quantity at the selected side even when the discharged air in the opposite side tends to increase dependent upon the direction of solar radiation According to a first aspect of the present invention, there is provided an apparatus for controlling an automotive air-conditioner including an air-flow duct having at least left and right air outlets disposed on left and right sides, respectively, a passenger component of a motor vehicle, the apparatus comprising: an air-distribution door adapted to be disposed adjacent to a downstream end of the air-flow duct for changing proportions of air distributed toward the left air outlet and air distributed toward the right air outlet; air-distribution setting means for setting proportions of air to be distributed toward the left air outlet and air to be distributed toward the right air outlet; solar radiating direction calculation means for calculating a direction of solar radiation based on quantities of solar radiation detected by at least two solar radiation sensors; solar radiation quantity calculation means for calculating an intensity of solar radiation based on the detected solar radiation quantities; air distribution door drive means for actuating the air distribution door selectively in an automatic mode and in a manual mode, based on an air distribution rate calculated by the air-distribution setting means and the solar radiating direction calculation means; and control system calculation means for selecting one of the automatic mode and the manual mode based on a predetermined solar radiation quantity when a vehicle passenger compartment temperature is lower than a predetermined temperature, and based on a characteristic performance curve higher than the predetermined solar radiation quantity when the vehicle passenger compartment temperature is higher than the predetermined temperature.

According to a second aspect of the present invention, there is provided an apparatus for controlling an automotive air-conditioner including an air-flow duct having at least left and right air outlets disposed on left and right sides, respectively, a passenger component of a motor vehicle, the apparatus comprising: an air-distribution door adapted to be disposed adjacent to a downstream end of the air-flow duct for changing proportions of air distributed toward the left air outlet and air distributed toward the right air outlet; air-distribution setting means for setting proportions of air to be distributed toward the left air outlet and air to be distributed toward the right air outlet; solar radiating direction calculation means for calculating a direction of solar radiation based on quantities of solar radiation detected by at least two solar radiation sensors; solar radiation quantity calculation means for calculating an intensity of solar radiation based on the detected solar radiation quantities; control system calculation means for performing a calculation to determine whether a left and right air distribution control be made in an automatic mode or in a manual mode; a manual air-distribution ratio calculation means for calculating the ratio of left to right air distribution dependent upon the position set by the air-distribution setting means when the result of calculation by the control system calculation means selects the manual control mode; automatic air-distribution ratio calculation means for calculating the ratio of left to right air distribution when the result of calculation by the control system calculation means selects the automatic control mode, in such a manner that if the position set the air-distribution setting means and the solar radiating direction are disposed on a same side, the rate of change of a control characteristic on this side is increased, and if the position set by the air-distribution setting means and the solar radiating direction are disposed on opposite sides, the rate of change of the control characteristic on the side of the solar radiating direction is reduced; and air-distribution door drive means for actuating the air-distribution door dependent upon the result of calculation by the automatic air-distribution ratio calculation means or the manual air-distribution ratio calculation means.

The above and other objects, features and advantages of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 8 is a graph showing characteristic performance curves illustrative of the amount of correction determined by the correlation between the solar radiating direction and the position of an air-distribution door;

FIG. 11 is a graph showing a characteristic performance curve illustrative of the correlation between the air-distribution door opening and the air-distribution lever position in a manual control mode.

DETAILED DESCRIPTION

The present invention will be described hereinbelow in greater detail with reference to a preferred embodiment shown in the accompanying drawings.

Figure 1:
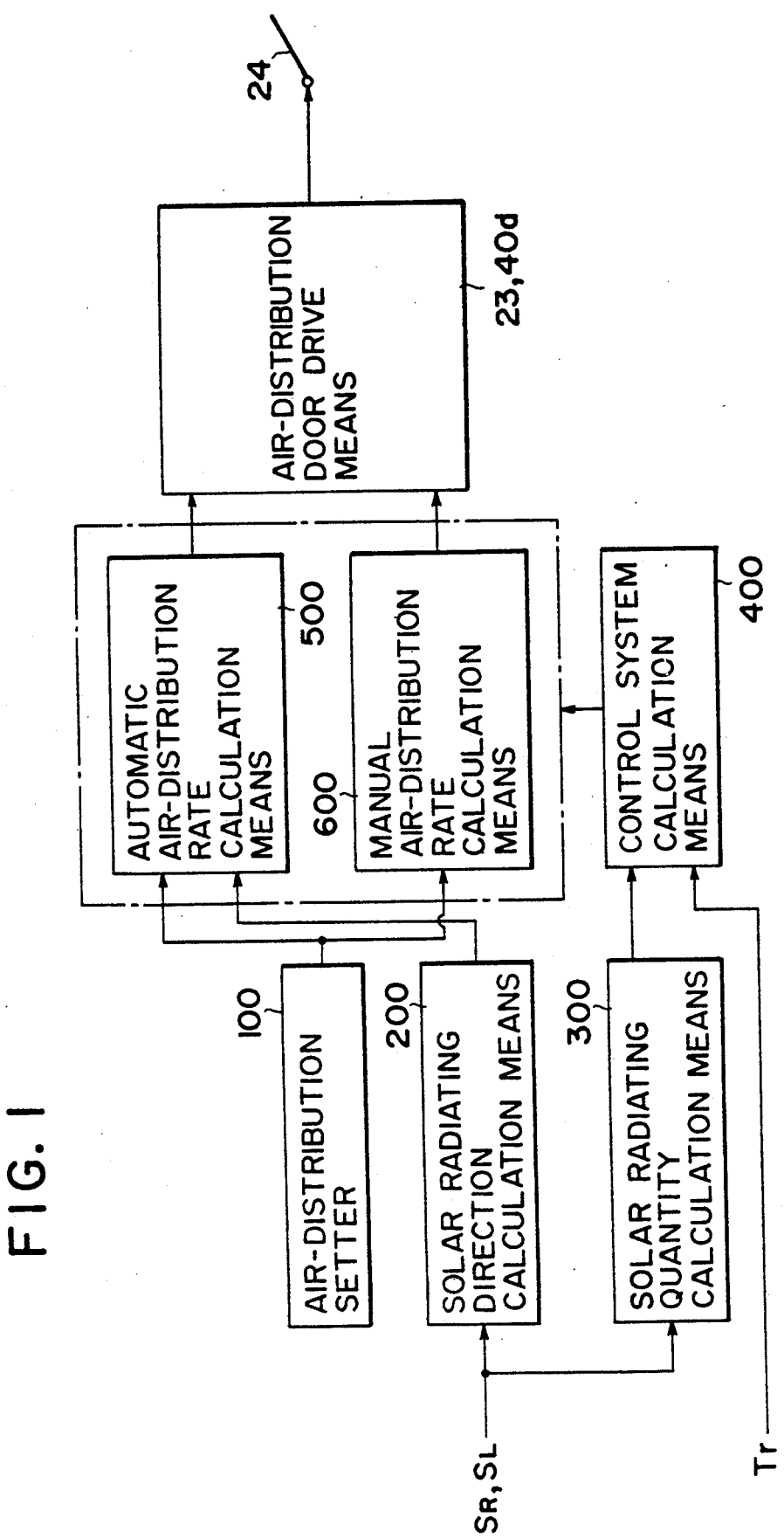
FIG. 1 is a block diagram showing the general construction of an apparatus for controlling an automotive air-conditioner according to the present invention.

As shown in FIG. 1, an apparatus for controlling an automotive air-conditioner generally includes an air-distribution door 24 adapted to be disposed adjacent to a downstream end of the air-flow duct l(FIG. 2) for changing proportions of air distributed toward a left air outlet 20 and air distributed toward a right air outlet 21 of the air-flow duct 1; air-distribution setting means or setter 100 for setting proportions of air to be distributed toward the left air outlet and air to be distributed toward the right air outlet; solar radiating direction calculation means 200 for calculating a direction of solar radiation based on quantities of solar radiation detected by at least two solar radiation sensors; solar radiation quantity calculation means 300 for calculating an intensity of solar radiation based on the detected solar radiation quantities; air distribution door drive means 23, 40d for actuating the air distribution door 24 selectively in an automatic mode and in a manual mode, based on an air distribution rate calculated by the air-distribution setting means and the solar radiating direction calculation means; and control system calculation means 400 for selecting one of the automatic mode and the manual mode based on a predetermined solar radiation quantity when a vehicle passenger compartment temperature is lower than a predetermined temperature, and based on a characteristic performance curve higher than the predetermined solar radiation quantity when the vehicle passenger compartment temperature is higher than the predetermined temperature.

With this construction, the solar radiating direction calculation means 200 and the solar radiation quantity calculation means 300 compute the solar radiating direction and the solar radiating quantity based on the detected solar radiation quantities. Based on the thus calculated solar radiation quantity and the detected vehicle passenger compartment temperature, the control system calculation means 400 determines whether the air-distribution control be made in an automatic mode or in a manual mode. More specifically, if the calculated solar radiation quantity is greater than the predetermined value, then the automatic control mode 500 is selected. On the other hand, if the calculated solar radiation quantity is smaller than the predetermined value, then the manual control mode 600 is selected In the manual control mode 600, if the vehicle passenger compartment temperature is higher than the predetermined temperature, a controllable range is enlarged to carry out the manual control in preference to the automatic control until the automatic control of the left and right air-distribution is needed.

The apparatus further includes a manual air-distribution ratio calculation means 500 for calculating the ratio of left to right air distribution dependent upon the position set by the air-distribution setting means 100 when the result of calculation by the control system calculation means 400 selects the manual control mode, and an automatic air-distribution ratio calculation means 600 for calculating the ratio of left to right air distribution when the result of calculation by the control system calculation means 400 selects the automatic control mode, in such a manner that if the position set by the air-distribution setting means 100 and the solar radiating direction are disposed on a same side, the rate of change of a control characteristic on the first side is increased, and if the position set by the air-distribution setting means BOO and the solar radiating direction are disposed on opposite sides, the rate of change of the control characteristic on the side of the solar radiating direction is reduced. The air-distribution door drive means 23, 40d actuates the air-distribution door 24 dependent upon the result of calculation by the automatic air-distribution ratio calculation means 500 or the manual air-distribution ratio calculation means 600.

The control characteristic is predetermined such that when the setting position is near the center of an adjustable range, the ratio of left to right air distribution is 1:1 and varies with the direction of solar radiation, and when the setting position is displaced from the center toward either side, the rate of change of the control characteristic on one side is increased if the direction of solar radiation is the same as the direction of displacement of the setting position, and the rate of change of the control characteristic on the opposite side is reduced if the direction of solar radiation is opposite to the direction of displacement of the setting position. As a result, a reduction of the quantity of air distributed to the side of the setting is small even when the solar radiating direction changes to one side which is the same as the setting position to the opposite side which is opposite to the setting position. Thus, the occupant's desire is reflected on the control of operation of the automotive air-conditioner.

Figure 2:
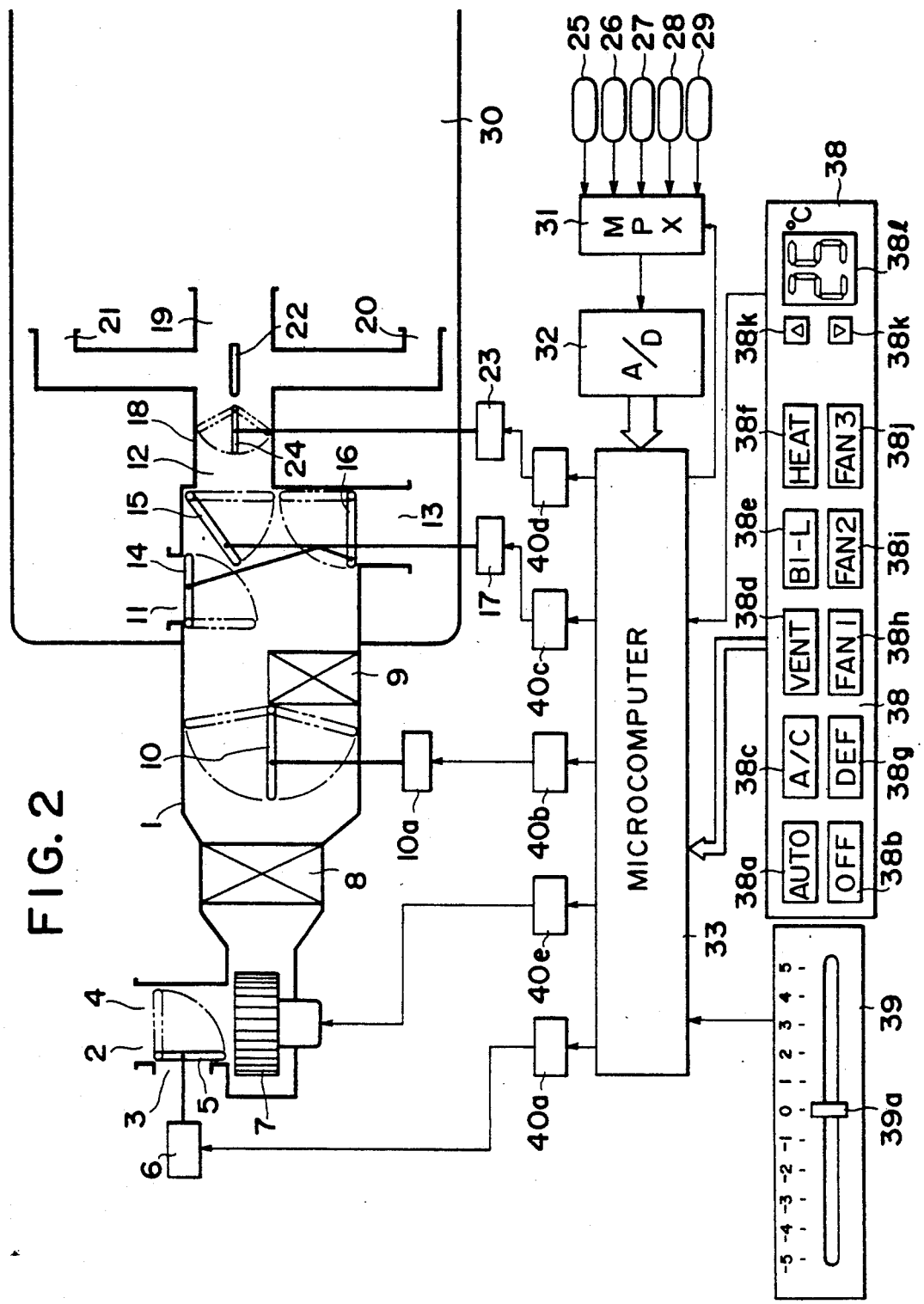
FIG. 2 is a diagrammatical view showing the controlling apparatus associated with an automotive air-conditioner.

FIG. 2 diagrammatically shows the controlling apparatus associated with the automotive air-conditioner. The air-conditioner includes an air-flow duct 1 having a recirculating air inlet 2 and an outside air inlet 3 which are provided in a bifurcated fashion. An intake door selection device 4 is disposed at the upstream end of the air-flow duct 1 and includes a selector door 5 disposed at the junction between the recirculated air inlet 2 and the outside air inlet 3. The selector door 5 is actuated by an actuator 6 to select the outside air or the recirculated air to be introduced into the air-flow duct 1.

A blower 7 is disposed in the duct 1 adjacent to the air inlets 2, 3 for forcing the air to flow downstream through the air-flow duct 1. The duct 1 also includes an evaporator 8 disposed downstream of the blower 7. The evaporator 8 is connected by piping with a compressor, a condenser, a receiver tank and an expansion valve to jointly constitute a refrigeration system or cycle. The air-flow duct 1 further contains a heater core 9 disposed on a downstream side of the evaporator 7 and an air-mix door 10 disposed at an upstream side of the heater core 9. The angular position of the air-mix door 10, that is, the opening of the air-mix door 10 is regulated by an actuator 10a so that proportions of air flowing through the heater core 10 and air bypassing the heater core 10 are changed to control the temperature of discharged air at a desired value.

The air-flow duct 1 has at its downstream end a defroster outlet 11, a vent outlet 12 and a heat outlet 13 that are provided in branched fashion and all open to a vehicle compartment 30. Three mode doors 14, 15, 16 are disposed adjacent to the respective outlets 11-13. Disposed downstream of the mode door 15 are a left air outlet 20, a right air outlet 21 and a central air outlet 19 that open to left, right and central part of the passenger compartment 30. A partition wall or plate 22 is disposed at the junction between the air outlets 19-21, and an air-distribution door 24 is disposed in front of the partition plate 22. The mode doors 14-16 are controlled by an actuator 17 and the air-distribution door 24 is controlled by an actuator 23 to provide a desired discharged mode and a desired air distribution to left and right portions of the passenger compartment 30.

The actuator 6, 10a, 17, 23 and a motor of the blower 7 are controlled by output signals issued from corresponding drive circuits 40a, 40b, 40c, 40d, 40e which are connected in circuit with a microcomputer 33.

Output signals from a solar radiation sensor 25 for detecting quantities $S_{R1}$, $S_{L1}$ of left and right side solar radiations, an output signal from an outside air temperature sensor 26 for detecting the outside temperature Ta, an output from a vehicle compartment temperature sensor 27 for detecting the temperature in the vehicle passenger compartment, an output signal from a mode sensor 28 for detecting the temperature Te at the downstream side of the evaporator 8, and an output signal from a head-part temperature sensor 29 for detecting the temperature of an upper part of the vehicle passenger compartment are supplied through a multiplexer 31 to an analog-to-digital (A/D) converter 32 in the order selected by the multiplexer 31. The A/D converter 32 digitizes these signals and supplies them to the microcomputer 33. The solar radiation sensor 25 is composed of right and left sensor elements $S_R$, $S_L$ disposed separately on right and left portions of an instrument panel of the motor vehicle for detecting the quantity of solar radiation directed on the right portion and the quantity of solar radiation directed on the left portion, respectively.

The controlling apparatus includes a control panel 38 which is provided with an auto switch 38a for changing over an automatic control mode and a manual control mode, an off switch 38b for turning all switches to the off state, an air-conditioner switch 38c, mode switches including a vent switch 38d, a bi-level switch 28e, a heat switch 38f and a defrost switch 38g, fan switches 38h, 38i and 38j for shifting the rotational speed of the blower 7, up and down switches 38k, 38k and an indicator or display 381 for setting the temperature Tset in the vehicle passenger compartment 30. Setting signals from these switches 38a-38k are inputted to the microcomputer 33.

The microcomputer 33 is also supplied with a setting signal delivered from an air-distribution control lever 39 having a slidable knob 39a is disposed in or adjacent to the control panel 38.

Figure 3:
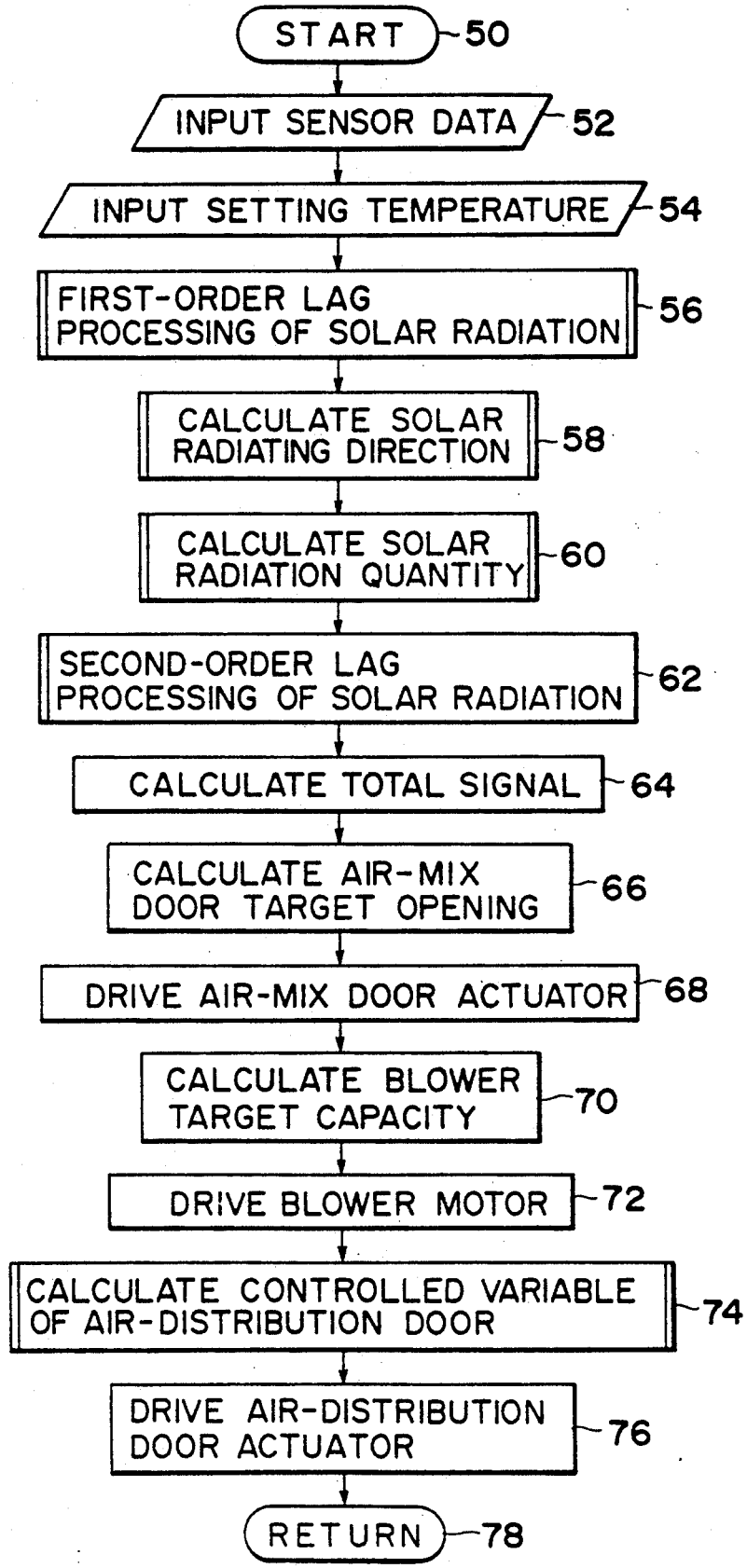
FIG. 3 is a flowchart showing a main routine achieved by a microcomputer incorporated in the controlling apparatus for performing the control of the automotive air-conditioner.

Operation of the microcomputer 33 for controlling the automotive air-conditioner will be described below with reference to a flowchart shown in FIG. 3.

A step 50 starts the control routine and in the next following step 52, data represented by detected signal values $S_{R1}$, $S_{R2}$, Ta, Tr, Te and Trh of the respective sensors, i.e. the solar radiation sensor 25, outside air temperature sensor 26, vehicle compartment temperature sensor 27, mode sensor 28 and head-part temperature sensor 29 are inputted to the microcomputer 33. Then a step 54 reads data indicative of a setting vehicle compartment temperature Tset which is set by the up and down switches 38k. Subsequently, the control goes on to a step 56 which performs a first-order lag processing of quantities of solar radiation detected by the right and left sensor elements $S_R$, $S_L$ of the solar radiation sensor 25. Although not described in detail, the first-order lag process is intended to correct the solar radiation quantities $S_{R1}$, $S_{L1}$ which go up and down sharply with time, to solar radiation quantities $S_{R2}$, $S_{L2}$ which A1 go up and down progressively with time. Thus, it is possible to avoid frequent changes of solar radiating direction which would other wise be caused by a change of the air-conditioning condition dependent upon a change of the solar radiation quantities. A step 58 carries out a solar radiating direction calculation routine, described later, to calculate the direction of solar radiation. Then, the control advances to a step 60 which perform a solar radiation quantity calculation routine, described later. After calculation of the amount of solar radiation Ts in the step 60, the control proceeds to a second-order lag processing of the solar radiation quantity in a step 62. Though not described in detail, the step 62 corrects the solar radiation quantities $S_{R2}$, $S_{L2}$ in such a manner as to change progressively at a predetermined rate, thereby smoothing changes of air-conditioning condition to meet the needs of the body sensation. Subsequently, the control advances to a step 64 to calculate a total signal T which is achieved based for example on detected values of the respective sensors in accordance with the equation $$T = Tr + Ka \cdot Ta + Ks \cdot Ts + Ke \cdot Te - Kset \cdot Tset + C$$

where Ka, Ks, Ke and Kset are gain constants and C is a calculation constant. Then, a step 66 calculate a target opening of the air-mix door 10 based on the total signal. The target opening thus calculated is used to drive the actuator 10a for controlling the air-mix door 10 in a step 68. Thereafter, a step 70 calculates a target capacity of the blower 7 and based on the thus calculated target capacity, the motor of the blower 7 is driven in a step 72. Subsequently, the control advances to an air-distribution door controlling amount calculating routine performed in a step 74. In this routine, the solar radiation quantity TS and the head-part temperature Trh is used to determine whether the left and right air-distributing control be achieved in an automatic mode or in a manual mode, and further to calculate the amount of control of the air-distribution door 24. In a step 76, the drive circuit 40d drives the actuator 23 to actuate the air-distribution door 24 based on the control amount calculated in the step 74. Thereafter, the control returns from a step 78 to the start step 50.

Figure 4:
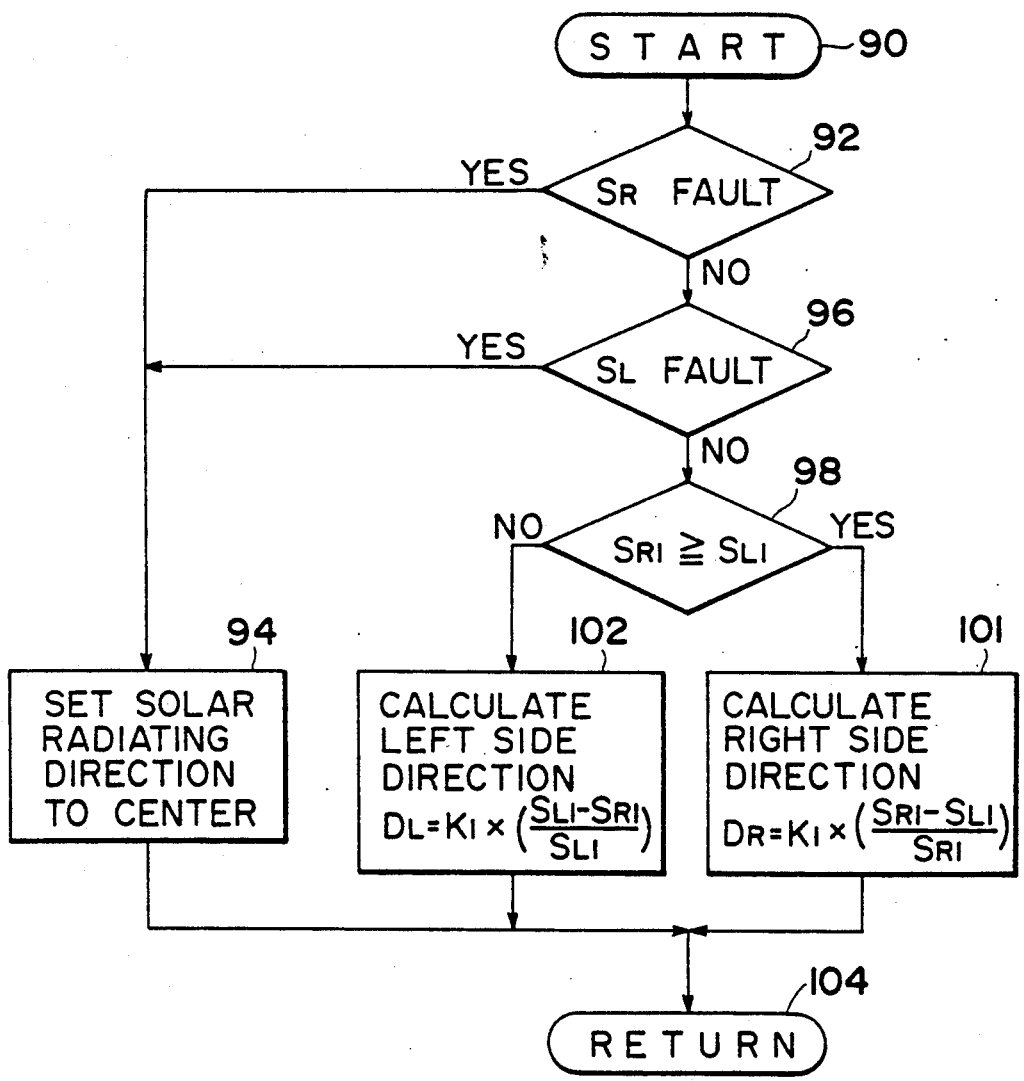
FIG. 4 is a flowchart showing a control routine achieved for the calculation of the direction of solar radiation.

The solar radiating direction calculation routine will be described in detail with reference to a flowchart shown in FIG. 4. This routine starts from a step 90 and then a step 92 judges whether the right solar sensor element $S_R$ is at fault (short-circuiting) or not. If yes, the control goes on to a step 94 which set the solar radiating direction to the center and thereafter moves to a return step 104 from which the control advances to the left and right air-distribution control routine. If the judgment in the step 92 is "no", the control advances to the step 96 which perform another judgment to determine whether the left solar radiation sensor element $S_L$ is faulty (short-circuiting) or not. If yes, the control goes on to the step 94 stated above. Conversely, if not, the control advances to a step 98 which compares the magnitude a detected value $S_{R1}$ delivered from the right solar sensor element $S_R$ and the magnitude of a detected value $S_{L1}$ delivered from the left solar sensor element $S_L$. If $S_{R1} \geq S_{L1}$, the control goes on to a step 101. If $S_{R1} < S_{L1}$, then the control advances to a step 102. The step 101 calculate the right side azimuth angle or bearings of the sun $D_R$ in accordance with the equation $$D_R = K1 \cdot (S_{R1} - S_{L1})/S_{R1}$$

where K1 is a constant. After this calculation step 101, the control advances to the return step 104. The step 102 calculate the left side azimuth angle or bearings of the sun $D_L$ in accordance with the equation $$D_L = K1 \cdot (S_{L1} - S_{R1})/S_{L1}$$

where K1 is the constant defined above. After this calculation step 102, the control proceeds to the return step 104 from which the control returns to the air-distribution control routine.

Figure 5:
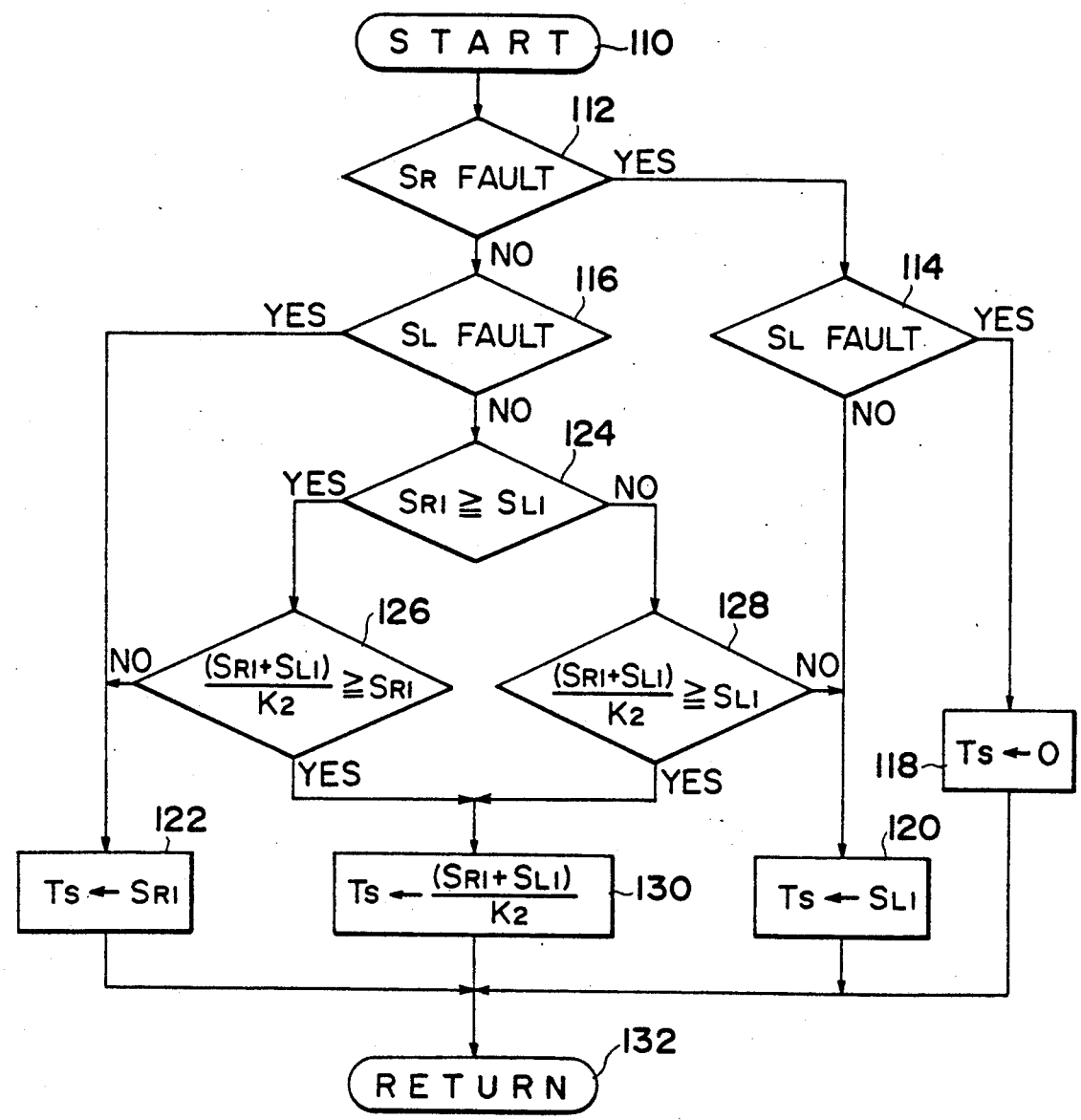
FIG. 5 is a flowchart showing a control routine achieved for the calculation of the quantity of solar radiation.

The solar radiation quantity calculation routine will be described in detail with reference to a flowchart shown in FIG. 5. This routine starts from a step 110 and then a step 112 judges whether the right solar sensor element $S_R$ is at fault (short-circuiting) or not. If yes, the control goes on to a step 114. If no, the control goes on to a step 116. The step 114 judges whether the left solar radiation sensor element $S_L$ is faulty (short-circuiting) or not. If yes, the control goes on to a 118 to set the solar radiation quantity (the intensity of solar radiation) Ts to 0 and thereafter advances to a return step 132. If no, the control goes on to a step 128 to set the solar radiation quantity Ts to the detected value $S_{L1}$ of the left solar radiation sensor element $S_L$ and then advances to the return step 132. The step 116 judges whether the left solar radiation sensor $S_L$ is faulty (short-circuiting) or not. If yes, the control goes on to a step 122. If no, the control advances to a step 124. The step 122 set the solar radiation quantity Ts to the detected value $S_{R1}$ of the right solar radiation sensor $S_R$ and then the control goes on to the return step 132. The step 124 compares the magnitude the detected value $S_{R1}$ of the right solar sensor element $S_R$ and the magnitude of the detected value $S_{L1}$ of the left solar sensor element $S_L$. If $S_{R1} \geq S_{L1}$, the control goes on to a step 126. If $S_{R1} < S_{L1}$, then the control advances to a step 128. The step 126 compares the detected value $S_{R1}$ of the right solar radiation sensor element $S_R$ with a composite value of the detected values $S_R$, $S_L$ of the right and left solar radiation sensor elements $S_R$, $S_L$ which is obtained in accordance with the equation $(S_R + S_L)K2$ where K2 is a constant. If $(S_R + S_L)/K2 \geq S_{R1}$, then the control advances to a step 130. Conversely, if $(S_R + S_L)/K2 < S_{R1}$, the control goes on to the step 122. The step 128 compares the detected value $S_{L1}$ of the left solar radiation sensor element $S_L$ with a composite value of the detected values $S_R$, $S_L$ of the right and left solar radiation sensor elements $S_R$, $S_L$ which is obtained in accordance with the equation $(S_R + S_L)/K2$ where K2 is the constant defined above . If $(S_R + S_L)/K2 \geq S_{L1}$, then the control advances to the step 130. Conversely, if $(S_R + S_L)/K2 < S_{L1}$, the control goes on to the step 120. The step 130 set the solar radiation quantity Ts to the composite value $(S_R + S_L)/K2$. Thereafter, the control advances to the return step 132 from which it returns to the main routine described above.

Figure 6:
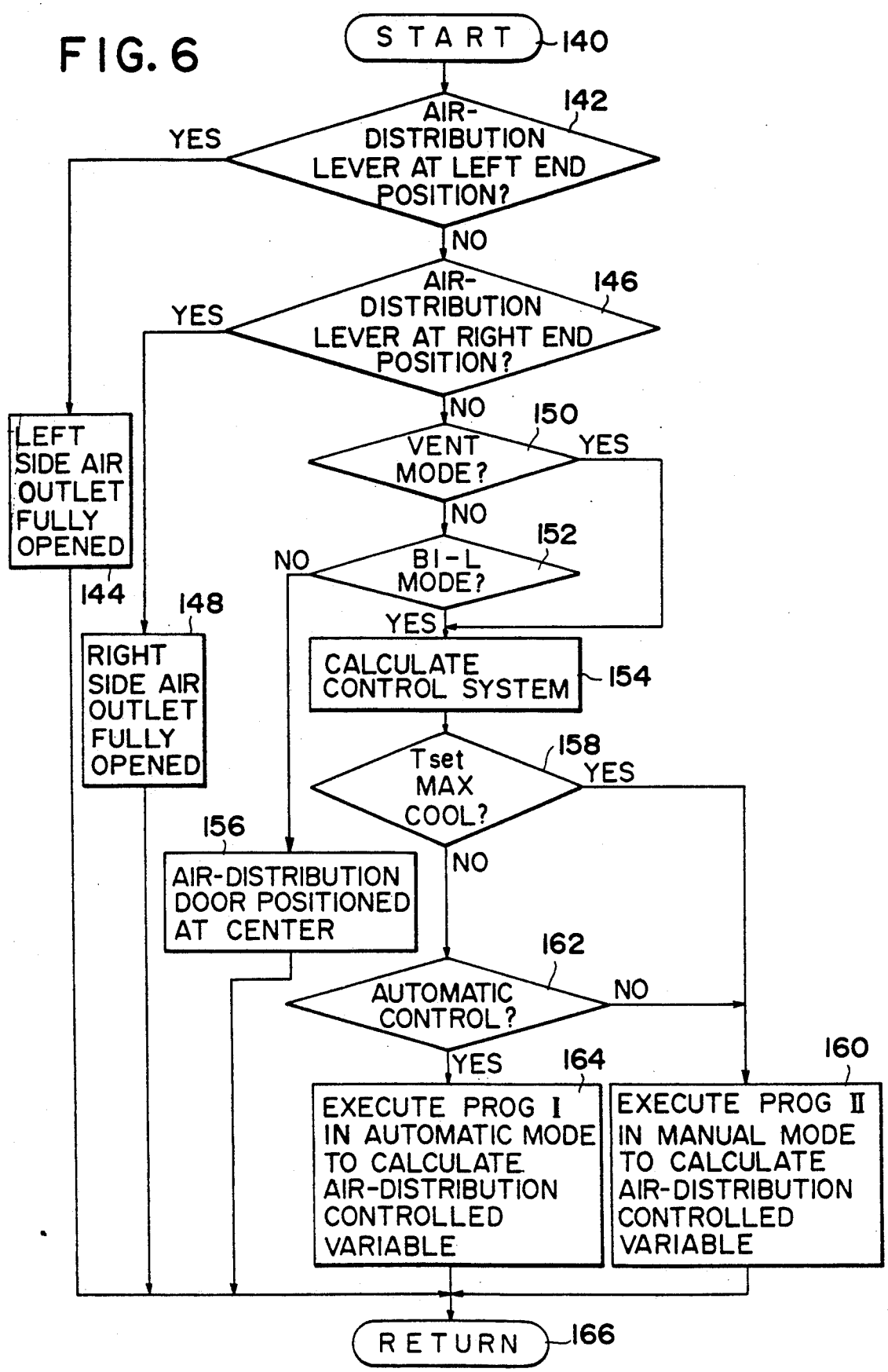
FIG. 6 is a flowchart showing a control routine for achieving the calculation of the controlled variable for actuating an air-distribution door.

The air-distribution door control amount calculation routine will be described in greater detail with reference to a flowchart shown in FIG. 6. The control starts from a step 140 and advances to a step 142. The step 142 judges whether the air-distribution control lever 39 (hereinafter referred to as "air-distribution lever") is located at the left end position (−5 position) or not. If yes, the control goes on to a step 144 to fully open the left air outlet 20 and thereafter advances to a return step 166. If no, the control advances to a step 146. The step 146 judges whether the air-distribution lever 39 is located at the right end position (+5 position) or not. If yes, the control goes on to a step 148 to fully open the right air outlet 21 and thereafter advances to the return step 166. If no, the control advances to a step 150. The step 150 judges whether the discharge mode is the vent mode or not. If yes, the control goes on to a step 154. If no, the control proceeds to a step 152 which makes another judgment to determine whether the discharge mode is the bi-level mode (BI-L1, BI-L2 or BI-L3). If the judgment in the step 152 is yes, then the control advances to the step 154. If no, the control goes on to a step 156 to set the air-distribution door 24 to the central position and thereafter advances to the return step 166. The step 154 performs a calculation to determine whether the left and right air-distribution control be made in the automatic mode or the manual mode. The calculation is carried out based on the solar radiation quantity Ts and the head-part temperature Trh. In this instance, the solar radiation quantity Ts is not derived from the difference between the detected values $S_{R1}$, $S_{L1}$ of the left and right solar radiation sensor elements as in the conventional practice, but is the composite value of these $S_{R1}$, $S_{L1}$ which is obtained by the operation indicated by the flowchart shown in FIG. 5.

In the manual control mode, the setting position of the air-distribution lever 39 and the air-distribution ratio of the left to right air outlet 20, 21 (that is, the angular position or opening of the air-distribution door 24) are direct proportional to each other, as shown in FIG. 8. After the step 160, the control advances to the return step 166. In a step 164, the amount of control needed for driving the air-distribution door 24 in the automatic mode is calculated. As shown in FIG. 8, proportions of air to be distributed to the left air outlet and air to be distributed to the right air outlet are determined depending on the solar radiating direction which is calculated based on the detected values $S_{R1}$, $S_{L1}$ of the right and left solar radiation sensor elements $S_R$, $S_L$. In this figure, if the solar radiating direction is changed from +40° to +60° for example (this means that the sunlight is directed from the right to the driver's seat side of the motor vehicle), the proportion of air distributed to the right air outlet 21 increases at the rate of 30%, as indicated by the solid line. This control characteristic varies with the position of the air-distribution lever 39 to shift vertically along the Y-axis of FIG. 8 between the right and left ends, as indicated by broken lines. When the solar radiating direction changes from −40° to −60° (the sunlight is directed from the left to the assistant driver's seat side), the proportion of air distributed to the left air outlet 20 increases at the rate of 30%. After the step 164, the control goes on to the return step 166 and thereafter returns to the main routine described above.

In the illustrated embodiment, the upper-part temperature Trh is used as a parameter to determine the mode of the air-distribution control including the setting of the air-distribution lever. It is possible according to the invention to use the vehicle passenger compartment temperature Tr in place of the upper-part temperature Trh.

Figures 7, 9:
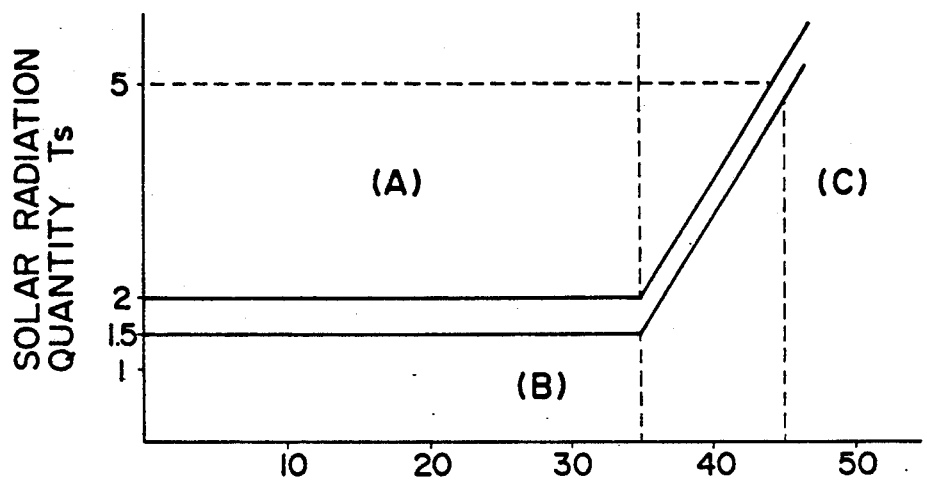
FIG. 7 is a graph showing characteristic performance curves illustrative of control zones determined by the correlation between the solar radiation quantity and the head-portion temperature in a vehicle passenger compartment.
FIG. 9 is a table showing the rate of change of air-distribution provided for each of a plurality of positions of the air-distribution lever.
Figure 10:
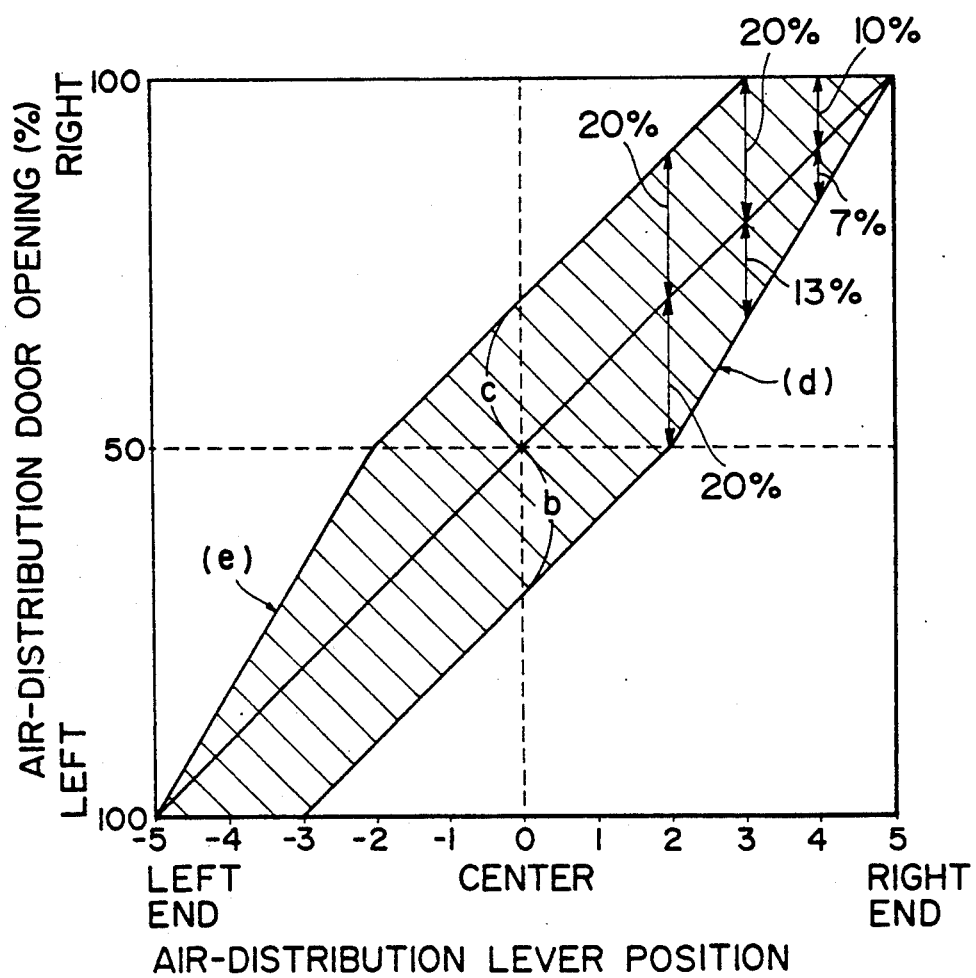
FIG. 10 is a graph showing characteristic performance curves illustrative of a controllable range of proportions of left and right air distribution determined based on the solar radiating direction in an automatic control mode.

The step 154 performs a calculation based on the solar radiation quantity Ts and the upper-part temperature Trh so as to determine whether the air-distribution control be taken in the automatic mode or the manual mode. When the solar radiation quantity Ts is relatively large and the upper-part temperature Trh is relatively low (that is, in a region (A) shown in FIG. 7), the automatic control mode is selected. When the solar radiation quantity Ts is relatively small and the upper-part temperature Trh is relatively high (a region (B) shown in FIG. 7), the manual control mode is selected. In the region (B), the air-distribution lever 39 is displaced frequently to adjust the left and right air-distribution. A region indicated by (C) is a dead zone. After the step 154, the control advances to a step 158. The step 158 judges whether the vehicle compartment setting temperature Tset is set to a minimum temperature (MAX COOL) or not. If yes, the control goes on to the step 160. If no, then the control proceeds to a step 162. The step 162 performs a judgment whether the result o±calculation in the step 154 selects the automatic control mode or not. If yes, the control advances to the step 164. If no, then the control goes on to the step 160. The step 160 sets proportions of left and right air distribution according to the characteristic performance curve indicated by PROG II in FIG. 11, which proportions varying with the position of the air-distribution lever 39. The step 164 calculates the amount of control needed for the automatic control of the air-distribution door 24, in accordance with the characteristic performance curves indicated by PROG I in FIG. 8. The control characteristic shown in FIG. 8 varies with the position of the air-distribution lever 39 so as to change proportions of left and right air distribution as the direction of solar radiation changes from +30° to +70° (or from −30° to −70°), for example. If the setting position of the air-distribution lever 39 is shifted from the +2 position to +3 position and then to the +4 position, the rate of change b% of air distribution to the left air outlet 20 varies from 20% to 13% and then to 7%, whereas the rate of change c% of air distribution to the right air outlet 21 varies from 20% to 20% and then to 10%, as tabulated in FIG. 9. Thus, the rate of change b% of air distribution set the left air outlet 20 is smaller than the rate of change c% of air distribution set for the right air outlet 21. The +2, +3 and +4 positions of the air-distribution lever 39 correspond respectively to the characteristic curves indicated by B, C an D in FIG. 8; the characteristic curve indicated by A corresponds to the central position of the air-distribution lever 39. If the setting position of the air-distribution lever 39 is shifted from the −2 position to −3 position then to the −4 position corresponding to the characteristic curves indicated by E, F and G, respectively, the rate of change b% of air distribution to the left air outlet 20 shifts from 20% to 20% and then to 10%, whereas the rate of change c% of air distribution to the right air outlet 21 shifts from 20% to 13% and then to 7%. That is, the rate of change b% set for the left air outlet 20 is greater than the rate of change c% set for the right air outlet 21. In other words, if the air-distribution lever 39 is set on the same side on the direction of solar radiation, the air distribution to that side increases at a greater change rate. On the other hand, if the setting position of air-distribution lever 39 is opposite to the direction to solar radiation, then the air distribution to the solar radiation side increased at a smaller change rate. Thus, if the air-distribution lever 39 is displaced from the center to one side, the air-distribution to this side does not reduce very much even when the air-distribution to the opposite side tends to increase under the influence of the solar radiating direction. Thus, the occupant desire is properly reflected on the control of the automotive air-conditioner. FIG. 10 shows a controllable range (indicated by hatching) obtained by the characteristic curves shown in FIG. 8. This range deviates ±20% from the characteristic performance curve (indicated by the central solid line) obtained when the direction of solar radiation is aligned with the direction of movement of the motor vehicle. When the setting position of the air-distribution lever 39 shifts from the +2 position toward the +5 position, for instance, the air distribution to the left air outlet 20 reduces progressively as indicated by a line portion (d). When the setting position is +3, the air distribution to the left air outlet 20 increases at a rate of 13%. Similarly, at the setting position +4, the left air distribution increases at a rate of 7%. When the air-distribution lever 39 is set in the +5 position, the rate of increase of the left air distribution is 0%. When the setting position of the air-distribution lever 39 is shifted from the −2 position toward the −5 position, the air-distribution to the right air outlet 21 varies in the same manner as done with the left air outlet 21 described above. After the step 164, the control advances to the return step 166 and then returns to the main routine.

Obviously, various modifications and variations of the present invention are possible in the light of the above teaching. For instance, the head-part temperature Trh which is used for determining the air-distribution control system may be replaced by the vehicle compartment temperature Tr. It is therefore to be understood that within the scope of the appended claims the present invention may be practiced otherwise than as specifically described.

What is claimed is:

1. An apparatus for controlling an automotive air-conditioner including an air-flow duct having at least left and right air outlets disposed on left and right sides, respectively, a passenger component of a motor vehicle, said apparatus comprising:
   (a) an air-distribution door adapted to be disposed adjacent to a downstream end of the air-flow duct for changing proportions of air distributed toward the left air outlet and air distributed toward the right air outlet;
   (b) air-distribution setting means for setting proportions of air to be distributed toward said left air outlet and air to be distributed toward said right air outlet;
   (c) solar radiating direction calculation means for calculating a direction of solar radiation based on quantities of solar radiation detected by at least two solar radiation sensors;
   (d) solar radiation quantity calculation means for calculating an intensity of solar radiation based on the detected solar radiation quantities;
   (e) air distribution door drive means for actuating said air distribution door selectively in an automatic mode and in a manual mode, based on an air distribution rate calculated by said air-distribution setting means and said solar radiating direction calculation means; and
   (f) control system calculation means for selecting one of the automatic mode and the manual mode based on a predetermined solar radiation quantity when a vehicle passenger compartment temperature is lower than a predetermined temperature, and based on a characteristic performance curve higher than said predetermined solar radiation quantity when the vehicle passenger compartment temperature is higher than said predetermined temperature.

2. An apparatus according to claim 1 wherein said solar radiating direction calculation means is operative to subtract from a larger quantity of solar radiation detected by one of said two solar radiation sensors a smaller quantity of solar radiation detected by the other solar radiation sensor, then divide the quantity obtained by the subtraction by said larger solar radiation quantity, and finally multiply the result of subtraction by a predetermined value, thereby calculating said direction of solar radiation.

3. An apparatus according to claim 1 wherein said solar radiation quantity calculation means is operative to add said solar radiation quantities detected by said two solar radiation sensors, then divided the quantity obtained by the addition by a predetermined value, subsequently compare the magnitude of the quantity obtained after division with the magnitude of a left side solar radiation quantity or a right side solar radiation quantity, and finally select a larger one of the compared quantities, thereby calculating said solar radiation quantity.

4. An apparatus according to claim 1 wherein said vehicle passenger compartment temperature includes a temperature of an upper part of the vehicle passenger compartment.

5. An apparatus according to claim 1 wherein a characteristic curve which separates the automatic mode and the manual mode is determined so that said solar radiation quantity is set at a relatively small value when said vehicle passenger compartment temperature is lower than said predetermined temperature and increases progressively when said vehicle passenger compartment temperature exceeds the predetermined temperature.

6. An apparatus for controlling an automotive airconditioner including an air-flow duct having at least left and right air outlets disposed on left and right sides, respectively, a passenger component of a motor vehicle, said apparatus comprising:
   (a) an air-distribution door adapted to be disposed adjacent to a downstream end of the air-flow duct for changing proportions of air distributed toward the left air outlet and air distributed toward the right air outlet;
   (b) air-distribution setting means for setting proportions of air to be distributed toward said left air outlet and air to be distributed toward said right air outlet;
   (c) solar radiating direction calculation means for calculating a direction of solar radiation based on quantities of solar radiation detected by at least two solar radiation sensors;
   (d) solar radiation quantity calculation means for calculating an intensity of solar radiation based on the detected solar radiation quantities;
   (e) control system calculation means for performing a calculation to determine whether a left and right air distribution control be made in an automatic mode or in a manual mode;

(f) a manual air-distribution ratio calculation means for calculating the ratio of left to right air distribution dependent upon the position set by said air-distribution setting means when the result of calculation by said control system calculation means selects the manual control mode;

(g) automatic air-distribution ratio calculation means for calculating the ratio of left to right air distribution when the result of calculation by said control system calculation means selects the automatic control mode, in such a manner that if the position set said the air-distribution setting means and the solar radiating direction are disposed on a same side, the rate of change of a control characteristic on this side is increased, and if the position set by said air-distribution setting means and the solar radiating direction are disposed on opposite sides, the rate of change of the control characteristic on the side of the solar radiating direction is reduced; and (h) air-distribution door drive means for actuating said air-distribution door dependent upon the result of calculation by said automatic air-distribution ratio calculation means or said manual air-distribution ratio calculation means.

7. An apparatus according to claim 6 wherein said solar radiating direction calculation means is operative to subtract from a larger quantity of solar radiation detected by one of said two solar radiation sensors a smaller quantity of solar radiation detected by the other solar radiation sensor, then divide the quantity obtained by the subtraction by said larger solar radiation quantity, and finally multiply the result of subtraction by a predetermined value, thereby calculating said direction of solar radiation.

8. An apparatus according to claim 6 wherein said solar radiation quantity calculation means is operative to add said solar radiation quantities detected by said two solar radiation sensors, then divided the quantity obtained by the addition by a predetermined value, subsequently compare the magnitude of the quantity obtained after division with the magnitude of a left side solar radiation quantity or a right side solar radiation quantity, and finally select a larger one of the compared quantities, thereby calculating said solar radiation quantity.

9. An apparatus according to claim 6 wherein said vehicle passenger compartment temperature includes a temperature of an upper part of the vehicle passenger compartment.

10. An apparatus according to claim 6 wherein said automatic air-distribution calculation means further varies the rate of change of control characteristic with the amount of deviation from the center of the setting position.

* * * * *